United States Patent Office 2,715,587
Patented Aug. 16, 1955

2,715,587

PROCESS FOR OBTAINING A PRODUCT HAVING A LEATHER-LIKE, TEXTURED FINISH

James D. Armitage, South Orange, Crittenden Bliss, Montclair, and Delton Ezell, West Orange, N. J., assignors to John L. Armitage & Co., Inc., Newark, N. J., a corporation of New Jersey No Drawing. Application July 8, 1953,
Serial No. 366,862

10 Claims. (Cl. 117—63)

This invention deals with a novel product having a tough, leather-like, protective finish and to a process for obtaining said finishes.

We are aware that numerous suggestions have already been made with the view of providing leather-like finishes made from plastic materials. It is an object of this invention to provide a process for making such finishes in a technically-simple and commercially-feasible manner.

The foregoing object and others are accomplished by the present invention, and the manner or manners in which this object and others are accomplished can be understood from the following description.

In general, our novel process comprises forming a layer of film-forming material by spraying a composition containing a film-forming resinous material in dispersed and in dissolved form and subjecting the resulting layer to the action of a solvent, and finally drying at an elevated temperature.

We presently prefer the application of our process in connection with the forming on metal of tough, leather-like, protective finishes. Our novel products have qualities which render them especially suitable for office equipment, such as typewriters, dictating machines, and the like. These qualities include a pattern surface, ease of application, remarkable wear, and chemical and abrasion resistance.

When employed on metal our novel process is advantageously conducted on the surface of metal first coated with a priming coat. Any conventional priming coat material is operable provided it has good adhesion to the metal and to the wrinkle layer formed thereon in accordance with our invention. As examples of satisfactory priming coats may be mentioned those comprising vinyl butyral resin, maleic-modified vinyl acetate-chloride copolymer (Bakelite VMCH) and vinyl acetate-chloride copolymers (Bakelite VAGH) modified with alkyd resins.

The resinous film-forming composition contains, as aforesaid, film-forming materials in dispersed and in dissolved form. Any dispersion type vinyl or other thermoplastic resin can be used, in the form of organosols, latices, or plastisols. Examples of such resin dispersions which may be mentioned are those sold under the following trade names: VYNV–1, VYNV–2, QYNV (all by Bakelite, a division of Union Carbide and Carbon Corporation); VR10 by the Naugatuck Chemical Division of U. S. Rubber Co.; Pliovic AO by Goodyear Tire & Rubber Co.; Geon 121 by Goodrich Chemical; and Dow Chemical's Latex 744–B.

As film-forming materials in dissolved form may be employed any resin which serves to bind the particles of the dispersed resin so that during the pre-drying and fusing periods no fissure or "mud-cracking" occurs. Examples of such resins are polyacrylates, polymethacrylates, urea-formaldehyde resins, polyester, alkyd and melamine-formaldehyde resins. Examples of such resins are those sold under the following trade names by the indicated firms: Acryloid B72 (Rohm and Haas), F240 N (Rohm and Haas), MX61 (Rohm and Haas) and alkyds such as those sold by General Electric under the trademark, Glyptal.

In addition to the film-forming resinous materials in dispersed and in dissolved form, the composition we employ to form a resinous layer includes other ingredients such as plasticizers, diluents and pigments. As plasticizers we mention dioctyl phthalate, diisooctyl adipate, tricresyl phosphate, dioctyl sebacate, polymeric type plasticizers such as Rohm and Haas' G–25, or other conventional primary vinyl plasticizers. As diluents we may employ various aromatic or aliphatic hydrocarbons such as benzene, naphtha and toluene, ketones such as diisobutyl ketone, and ester solvents such as amyl acetate.

Any of the pigments suitable for incorporation in resinous films may be employed in accordance with our invention. Examples of such pigments are titanium dioxide, aluminum pigment, clays and silicates.

We have found that oxygenated solvents give excellent results when employed as texturing agents in accordance with our process. Examples of such solvents include acetone, methyl ethyl ketone, cyclohexanone and isophorone.

As will be appreciated by those skilled in the art other ingredients may be employed as adjuvants.

As will be appreciated by those skilled in the art the precise formulae employed in accordance with our present invention will vary depending upon a number of factors, including the particular ingredients employed and the conditions to which the materials are subjected, for example, thickness of resinous layer, temperature and time of drying, molecular size of the resins, etc. Hence, although the precise formula in each case is a delicately balanced one, the number of variables entering into the situation is such that it would serve no useful purpose to specify permissive and preferred amounts and treatment conditions in general.

It is believed, however, that anyone skilled in the art can without the exercise of any invention utilize the herein-described teachings of our present invention in order to make the desired finishes.

As guides in the preparation of the desired materials and in conducting our novel process, we give below the following data:

The priming coat may be 0.25 to 1 mil in thickness and should have the following appearance and properties before the texture layer material is applied thereto: It should be a flat or semi-gloss priming coat with the desired properties of good adhesion, good film and covering, toughness, and rust inhibitive properties.

The thickness of the layer formed by the sprayed composition containing the resinous material in dispersed and in dissolved form is advantageously between 8 and 80 mils prior to drying and between 4 and 40 mils after drying and fusing at elevated temperatures.

The spray composition is generally treated as follows prior to exposing it to the action of the oxygenated solvents:

The spray composition is applied by normal industrial methods with the top-coat material being cut approximately 2–1 with toluol as a reducing solvent, sprayed with approximately 40 lbs. air pressure and 20 lbs. liquid pressure to a wet film thickness of from 8–80 mils. With excessively heavy film thickness, that is of 20 mils wet, or more, the thickness must be brought up by various sprayed coats with a certain amount of time for drying in between coats. In very heavy film thickness some pre-drying may be necessary prior to texturing the material and after texturing prior to fusing.

After the oxygenated solvent has been applied, either by spraying it on the surface of the formed resinous layer or by exposing the layer to vapors of the solvent in a chamber saturated therewith, the resulting product is treated at an elevated temperature ranging from 275° to 375° F. for a period of from 3 to 30 minutes until a tough, leather-like, protective finish has been formed.

In order further to clarify our present invention, the following examples are given for purposes of illustration and not limitation of our invention.

*Example I*

The ingredients for a gray rust inhibiting primer to be used as the adhesive undercoat for the leather-like finish may be prepared by charging the following ingredients two thirds full into a standard ball or pebble mill and grinding for 72 hours.

10 parts zinc chromate pigment (Imperial X2127)
3 parts aluminum stearate (Witco #18)
81½ parts micronized talc (Whittaker, Clark & Daniels #399)
1½ parts carbon black (Carbon Gas ELF #1)
10½ parts yellow oxide of iron (Mapico Orange)
12 parts diatomaceous earth (Johns-Manville Celite 267)
45 parts titanium dioxide (Titanium Pigments RA 50)
63 parts urea formaldehyde resin (Rohm & Haas F 240N)
19 parts sebacic acid type plasticizer (Rohm & Haas G 62)
19 parts dioctyl phthalate plasticizer (Carbide & Carbon DOP)
162 parts maleic treated vinyl acetate—vinyl chloride copolymer resin (Bakelite Vinylite VMCH)
82 parts vinyl acetate—vinyl chloride copolymer resin (Bakelite Vinylite VYHH)
672 parts methyl isobutyl ketone (Carbide & Carbon MIBK)

The primer is thinned for use to a spraying consistency (21 sec. on a #2 Zahn cup) with a solvent made up as follows:

5 parts 85% phosphoric acid
95 parts methyl isobutyl ketone

The primer should be applied to clean degreased metal with ordinary spray technique using commercial industrial spray painting equipment. Liquid (tank) pressure of 10 to 20 pounds and line (air) pressure of 40 to 60 pounds is desirable. A wet film thickness of approximately 1 mil is sufficient for most applications. The primed pieces should be baked at 300 to 325° F. for 10 to 15 minutes. The primed pieces do not ordinarily require sanding of any kind.

*Example II.—Armorhide*

75 parts chlorinated biphenyl (Monsanto Arochlor 5460)
75 parts toluol (Esso Toluol)

The arochlor 5460 and toluol are cut to a 50% solution in an ordinary gum cutter. The solution is then added to the following:

150 parts dioctyl phthalate (Carbide & Carbon DOP)
280 parts polymerized sebacic acid type plasticizer (Rohm and Haas G25)
15 parts cadmium stabilizer (Harshaw 2–V–4)
30 parts barium stabilizer (Harshaw 1–V–3)
44 parts zinc stabilizer (Harshaw 9–V–1)
30 parts epoxy stabilizer (Harshaw 7–V–1)
90 parts dioctyl adipate plasticizer (Ohio Apex 2 EH)
150 parts precipitated calcium carbonate (Diamond Alkali "Surfex")
50 parts titanium dioxide pigment (Titanium Pigment RA50)
10 parts lampblack (Stanley Doggett 3050)

Mix all of the above ingredients in a paste mixer and grind 2 times over a three roll paint mill. Add the resulting paste to the following:

80 parts dioctyl phthalate (Carbide & Carbon DOP)
20 parts sol'n. 1% silicone oil in xylol (General Electric SF69)
1400 parts polyvinyl chloride resin dispersion type (Goodrich Chemical Geon 121)
400 parts toluol (Esso Toluol)
60 parts non leafing aluminum paste 60% solids (Reynolds 40LN)
450 parts urea formaldehyde resin (Rohm & Haas Uformite F240N)

Grind the resulting mixture 2 times over a three roller mill. The gray liquid plastic resulting from this processing should then be reduced with equal parts of toluol or xylol for spray application. A viscosity of approximately 35–40 sec. on a Zahn #2 cup is desirable. The Armorhide should be applied in a series of vertical and horizontal passes on the primed metal. A wet coat applied so that it does not drip or sag should be used. Wet film thickness of 10 to 80 mils may be applied over the primed pieces of Example I. The texturing agent, in this case cyclohexanone is applied by ordinary spray technique. The texturing material should not be too highly atomized in order to give the best results. In the example followed a liquid pressure of 30 pounds on standard industrial spray equipment with no line pressure gives the desired results. A slight period of time may be allowed for the texture to form, then the finished pieces should be placed in a convection oven and baked to remove solvents by gradually raising the temperature from 250° to 350° F. over a period of 3–40 minutes. Fusing takes place from 340° F. to 375° F. and the length of time for fusing will vary from 1 min. to 30 min. In the example followed with 18 gauge steel and Armorhide film thickness of 10 mils wet the finish would be pre-heated for 30 min. at 200 to 330° F. then fused for 20 min. at 340° F.

*Example III*

Another type of transparent primer used for decorative purposes over polished metal may be made up as follows: Charge into a ball mill the following:

10 parts phthalocyanine blue pigment (Du Pont BP 173–D)
60 parts urea formaldehyde resin (Rohm and Haas F–240–N)
140 parts alkyd resin (General Electric Glyptal 2477)
140 parts hydroxylated vinyl acetate vinyl chloride copolymer resin (Bakelite Vinylite VAGH)
300 parts methyl ethyl ketone (Shell Chemical)
300 parts di-isobutyl ketone (Carbide & Carbon DIK)

This was processed according to the procedure of Example I.

*Example IV*

The following materials may be charged into a pebble mill and ground 4 to 12 hours:

70 parts ketone base synthetic resin (Krumbhaar 1717 gum)
150 parts tricresyl phosphate (Monsanto TCP)
275 parts high molecular weight polyester (Carbide & Carbon)
42 parts cadmium barium stabilizer (Witco #80)
95 parts dicapryl phthalate (Hatco Cml. DCP)
80 parts dioctyl sebacate plasticizer (Rohm and Haas DOS)
1500 parts polyvinyl chloride resin (Bakelite Vinylite VYNV2)
800 parts xylol (Esso Xylol)
675 parts sol'n. 40% polymethyl methacrylate in toluol (Rohm and Haas B72)

The ingredients were processed in accordance with Example II over the primed pieces made in accordance with Example III. A brilliant frosted effect resulted.

In any of the above formulations substitutions of raw materials and processing may take place. For example Vinylite QYNV could be substituted in the above formulation for Vinylite VYNV2 and the material could be mixed in a heavy duty mixer instead of grinding, due to the finer particle size of the QYNV Resin. The essential part of all formulations is the balance of dispersed resins, binder resins and plasticizers.

With regard to the texturing materials used on the above products we have found that cyclohexanone is the most satisfactory agent in most circumstances. However, as we have previously stated acetone methyl isobutyl ketone, or similar products may be used. In addition to this, soluble dye colors, pigment or inert dispersions in plasticizers or resins may be added to the texturing agent to give additional decorative effects.

The foregoing illustrates the practice of this invention which however is not to be limited thereby but is to be construed as broadly as permissible in view of the prior art and limited solely by the appended claims.

We claim:

1. A process for obtaining a tough, leather-like, textured finish, which comprises forming a layer with a composition containing at least one resinous material in substantially unsolvated dispersed form and in dissolved form, the amount of said dissolved resin being sufficient to avoid mud-cracking, applying to said layer an organic, oxygenated resin solvent to form a leather-like, textured finish, and fusing said layer while retaining said textured finish.

2. The process of claim 1, wherein a vinyl resin is the resinous material in dispersed form, an acrylate resin is the resinous material in dissolved form, and a ketone is the solvent applied.

3. A process for obtaining a tough, leather-like textured coating on metal, which comprises forming a thin coating on metal with a material which adheres thereto and to which a layer of vinyl resin also adheres, forming a top layer in adhering relation to said coating with a composition containing at least one resinous material in substantially unsolvated dispersed form and in dissolved form, the amount of dissolved resin being sufficient to avoid mud-cracking, applying to said layer an organic, oxygenated resin solvent to form a leather-like, textured finish; and fusing said layer while retaining said textured finish.

4. The process of claim 3, wherein a vinyl resin is the resinous material in dispersed form, an acrylate resin is the resinous material in dissolved form and a ketone is the solvent applied.

5. The process of claim 3, wherein said composition also contains plasticizers, diluents and pigments.

6. The process of claim 4, wherein cyclohexanone is the ketone employed.

7. The process of claim 4, wherein acetone is the ketone employed.

8. The process of claim 4, wherein said composition also contains plasticizers, diluents and pigments.

9. The process of claim 8, wherein cyclohexanone is the ketone employed.

10. The process of claim 8, wherein acetone is the ketone employed.

References Cited in the file of this patent

UNITED STATES PATENTS

| Number | Name | Date |
| --- | --- | --- |
| 2,385,920 | Jenkins | Oct. 2, 1945 |
| 2,427,513 | Spessard | Sept. 16, 1947 |
| 2,431,078 | Powell et al. | Nov. 18, 1947 |
| 2,575,046 | Chavannes et al. | Nov. 13, 1951 |